Aug. 21, 1956 J. MARCO 2,759,518
CONTINUOUS LAMINATED FABRIC MAKING APPARATUS AND METHOD
Filed Aug. 10, 1954 3 Sheets-Sheet 3
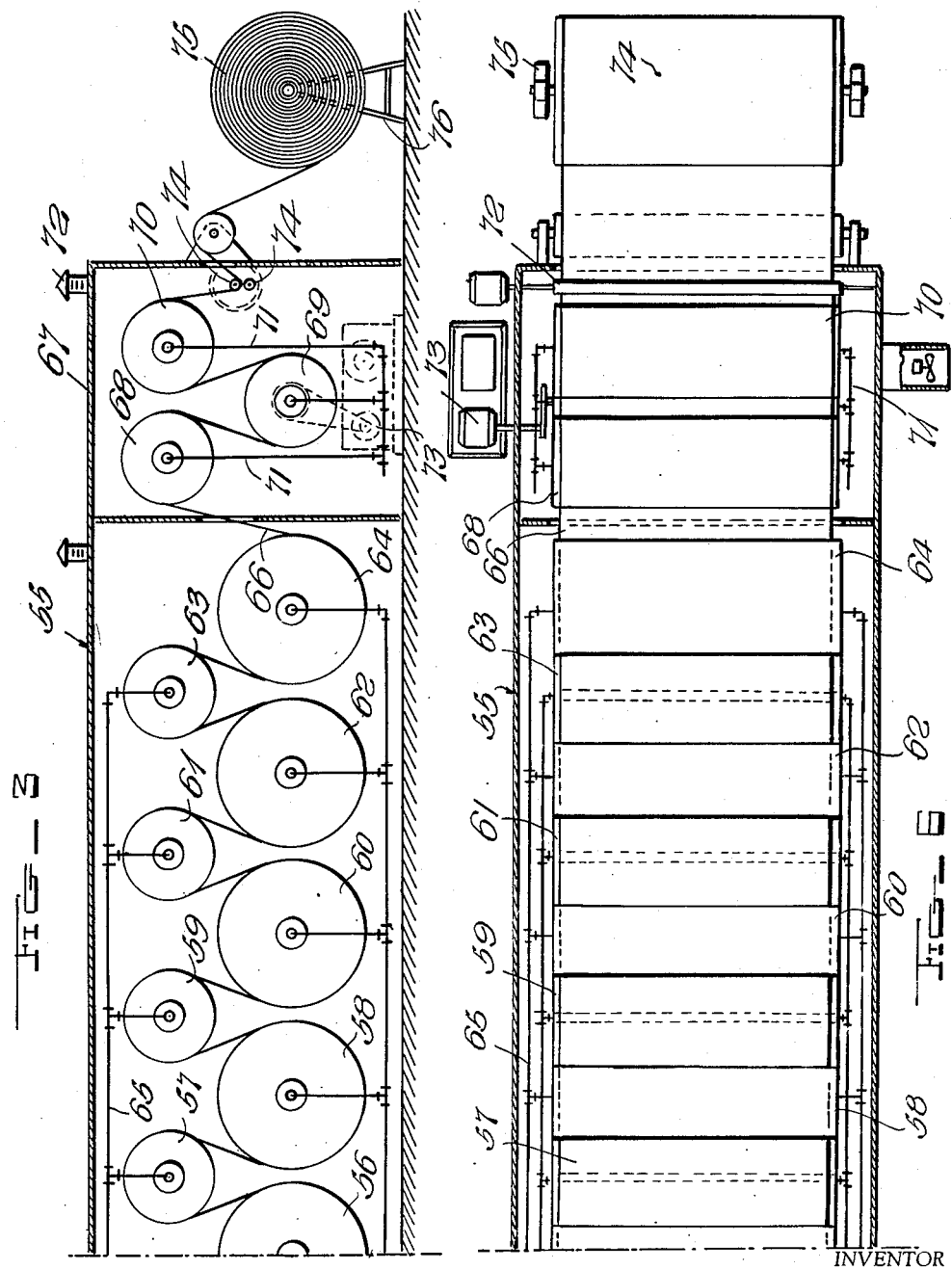
INVENTOR
JOHN MARCO,
BY Jacobi & Jacobi
ATTORNEYS United States Patent Office 2,759,518
Patented Aug. 21, 1956

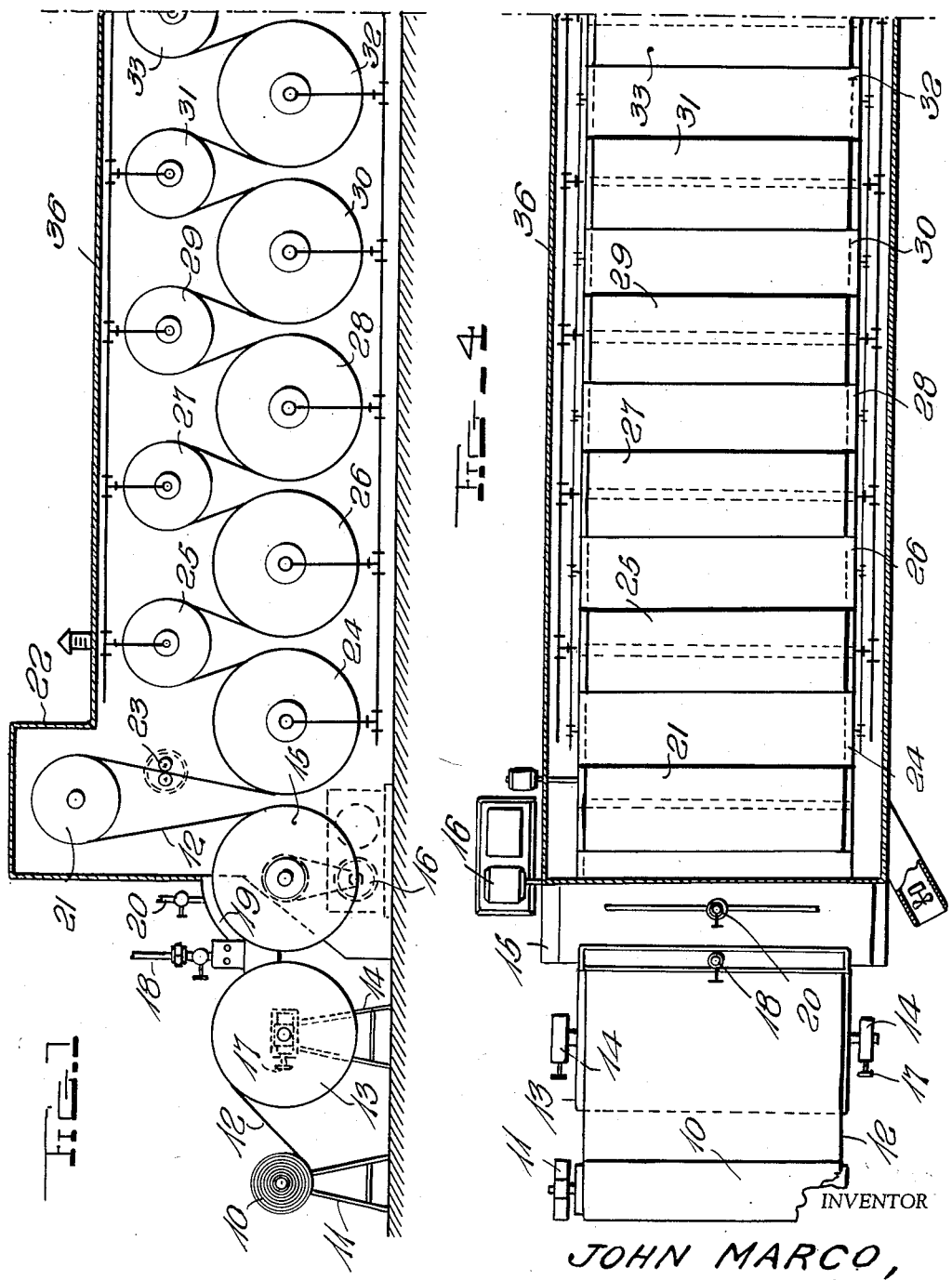

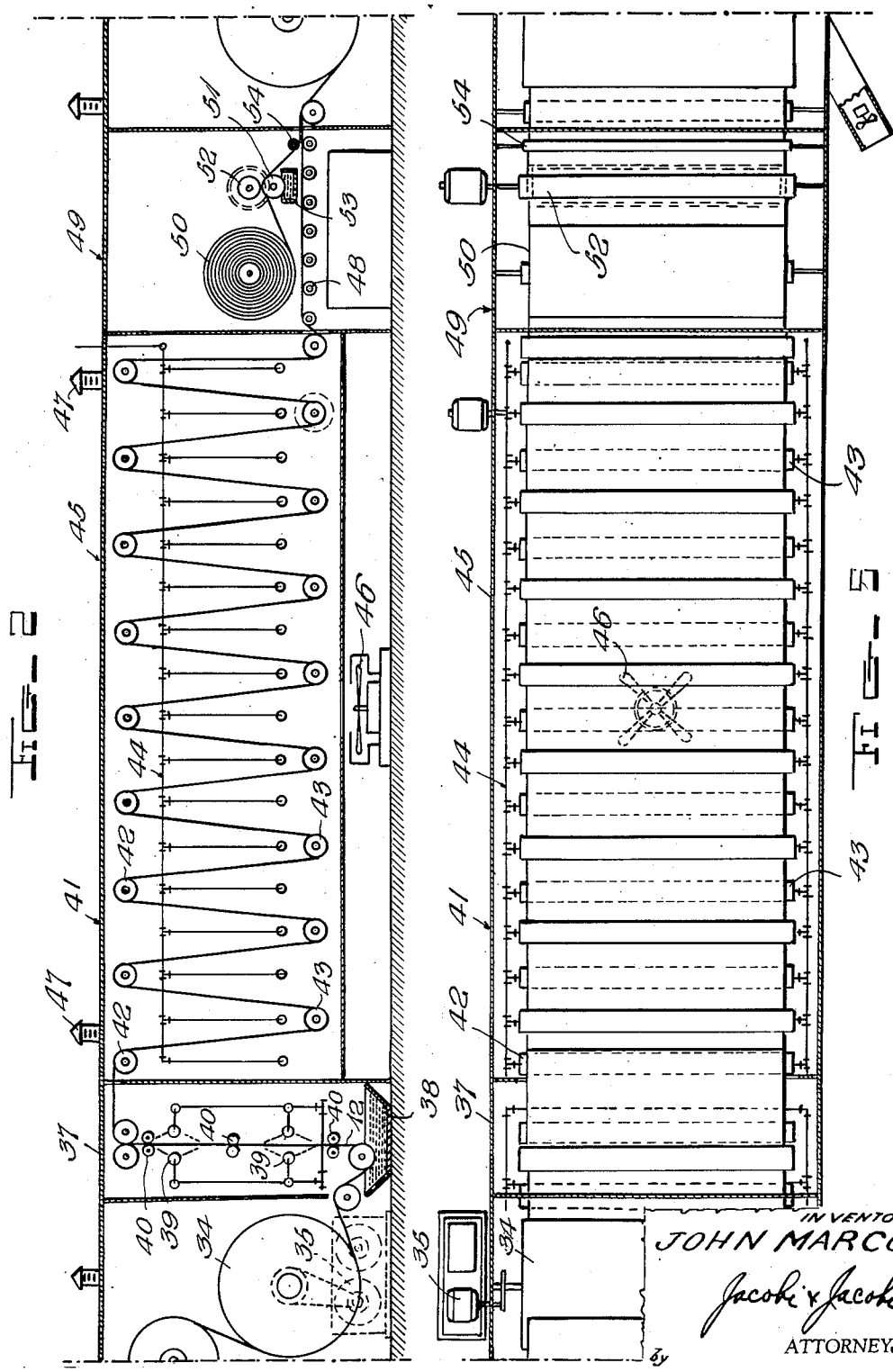

2,759,518

CONTINUOUS LAMINATED FABRIC MAKING APPARATUS AND METHOD

John Marco, Wilmington, Del.

Application August 10, 1954, Serial No. 448,908

14 Claims. (Cl. 154—1)

This invention relates to the production of laminated fabrics and more particularly to an apparatus and process for applying a backing such as foam rubber to carpets or other fabrics.

Briefly stated the apparatus includes means for feeding a continuous web of open mesh fabric, applying a coating of foam rubber to the same, partially vulcanizing this rubber coating, washing the combined web and foam rubber coating, drying this composite structure, inspecting the same to detect imperfections therein, feeding relatively close mesh fabric such as a rug and applying cement to one surface thereof, bringing such cemented surface into intimate contact with the foam rubber to unite the same, finally vulcanizing the foam rubber and curing the cement and cooling the laminated fabric all as a continuous process and winding the completed fabric in a roll for final disposition thereof.

The apparatus of this invention includes a series of rolls over which the fabric passes, these rolls being heated in the initial vulcanizing stage and providing a zig-zag path during the drying stage. For inspection purposes a series of horizontally disposed rolls are provided over which the fabric passes to permit visual inspection thereof prior to uniting with the relatively close mesh fabric to provide the final laminated fabric product produced by this apparatus. In the final vulcanizing stage the laminated fabric passes over heated rolls and thereafter the same is cooled by passing over cooled rolls in a chamber provided with air circulation means after which the laminated fabric is rolled for final disposition. If desired, the surface of the foam rubber covered by the open mesh fabric may be embossed in any desired design.

It is therefore an object of the invention to provide an apparatus for producing a laminated fabric consisting of an open mesh fabric, a layer of foam rubber and a relatively close mesh fabric in a continuous operation.

A further object of the invention is the provision of an apparatus for producing a laminated fabric consisting of an open mesh fabric, a layer of foam rubber and a relatively close mesh fabric such as a rug, in which the foam rubber and open mesh fabric is washed and visually inspected prior to uniting with the close mesh fabric.

A still further object of the invention is the provision of an apparatus for producing a laminated fabric consisting of a web of open mesh fabric, a layer of foam rubber and a layer of close mesh fabric such as a rug, in which the foam rubber is partially vulcanized, the foam rubber and web washed and dried and visually inspected, a layer of close mesh fabric such as a rug cemented to the foam rubber, the foam rubber being finally vulcanized and the cement cured and the resulting laminated fabric cooled prior to rolling for final disposition.

Another object of the invention is the provision of an apparatus for producing a laminated fabric consisting of a web of open mesh fabric, a layer of foam rubber and a layer of close mesh fabric such as a rug in which means is provided for embossing any desired design in the side of the fabric covered by the web.

A further object of the invention is the provision of an apparatus for producing laminated fabric consisting of a web of open mesh fabric, a layer of foam rubber and a layer of close mesh fabric such as a rug in which means is provided for vulcanizing the foam rubber during which vulcanization the web and foam rubber alternately engage heated drums in order to rapidly impart heat to the fabric and to permit the escape of moisture and vapors therefrom.

A still further object of the invention is the provision of a method of continuously producing laminated fabric consisting of an open mesh web, a layer of foam rubber and a layer of close meshed fabric such as a rug.

Further objects and advantages of the invention will be apparent from the following description taken in conjunction with the accompanying drawings in which:

Fig. 1 is a more or less diagrammatic side elevational view showing the web feeding, foam rubber applying and initial vulcanizing sections of the apparatus of this invention;

Fig. 2, a view similar to Fig. 1 and constituting a continuation thereof showing the washing, drying, inspection and close mesh fabric cementing and applying sections of the apparatus of this invention;

Fig. 3, a view similar to Fig. 1 and showing the final vulcanizing section, the cooling section, and the final winding drum for receiving the completed laminated fabric;

Fig. 4, a top plan view of the portion of the apparatus shown in Fig. 1;

Fig. 5, a top plan view of the portion of the apparatus shown in Fig. 2; and

Fig. 6, a top plan view of the portion of the apparatus shown in Fig. 3.

With continued reference to the drawing there is shown in Fig. 1 a roll 10 for supplying a web of open mesh fabric which may be rotatably carried by a suitable support 11, the web 12 passing over a spreader roll 13 rotatably mounted on a suitable support 14. From spreader roll 13 the web 12 passes around and under a gelation roll 15 which may be driven by a motor 16 or other suitable drive means. The distance between spreader roll 13 and gellation roll 15 may be varied by adjusting means 17 provided as a part of the mounting 14 of the spreader roll 13.

Foam rubber is supplied through a conduit 18 from a foam rubber generator, not shown, to the space between spreader roll 13 and gelation roll 15, this foam rubber being deposited in a layer of uniform thickness on the web 12 as it passes over spreader roll 13. Gelation roll 15 is heated in order to impart such heat to the foam rubber and cause gelling of the same but in order to not impart such heat too rapidly the surface of the gelation roll 15 immediately prior to contact of the same with the foam rubber may be cooled by a shoe 19 in contact therewith which shoe may be formed of sponge rubber or other suitable material and supplied with cooling liquid, such as water, through a conduit 20.

From gelation roll 15 the web passes upwardly and over an idler roll 21 rotatably mounted within a chamber 22 and from idler roll 21 the web 12 passes between feeding rolls 23 which serve to maintain a constant tension in the web 12 and to control the thickness of the foam rubber layer deposited thereon. If desired one of the feeding rolls 23 may be provided with a suitable surface to emboss any desired design in the web 12 to which the foam rubber has been applied.

After leaving feeding rolls 23 the web 12 and foam rubber applied thereto passes over vulcanizing rolls 24, 25, 26, 27, 28, 29, 30, 31, 32, and 33, with the foam rubber side in contact with the rolls 24, 26, 28, 30, and 32, and with the web side in contact with the rolls 25, 27, 29, and 31. All of these rolls are heated by steam or other suitable means and means (not shown) likewise may be provided to accurately control the temperature thereof. Furthermore, the surface of the rolls is accurately machined to provide a smooth intimate contact with the fabric thus resulting in rapidly imparting heat to the foam rubber to accelerate vulcanization of the same and provide a relatively smooth surface thereon, the contact of the web 12 with the rollers 25, 27, 29, and 31, permitting escape of moisture and vapors from the fabric during vulcanization thereof.

From the initial vulcanizing section described above in which the foam rubber applied to the web 12 is partially cured, the composite fabric passes under a feeding drum 34 driven by a motor or other suitable means 35 which serves to pull the fabric through the initial vulcanizing section 36 and feeds the same to a washing section 37. This section includes a washing bath 38 through which the web 12 and foam rubber passes, a series of sprays 39 and a series of squeezing rolls 40 which serves to thoroughly wash the composite fabric and squeeze the washing liquid therefrom.

From the washing section 37 the web 12 and foam rubber applied thereto passes into a drying section 41 provided with a series of rollers 42 and 43 arranged in staggered relationship whereby the web 12 and foam rubber applied thereto travels through the drying section 41 in a zig-zag path. Heated coils or pipes 44 are provided within the chamber 45 enclosing the drying section 41 and air is circulated through this chamber by a fan or other suitable means 46 such air escaping through vents 47.

From drying section 41 the web 12 and foam rubber applied thereto passes over a series of horizontally disposed rollers 48 which permit visual inspection thereof in order to locate any imperfections or flaws therein.

Adjacent the inspection station 49 there is provided a source of relatively close mesh fabric such as a roll of rug material 50, this material being fed between rolls 51 and 52, roll 51 being immersed in a supply of cement, such as liquid latex 53, and serving to apply such cement to one surface of the rug material 50 such material 50 passing beneath a pressure roller 54 which serves to bring the latex coated surface of the same into intimate contact with the foam rubber applied to the web 12.

From the inspection station 49 the laminated fabric consisting of the web 12, the foam rubber applied thereto and the rug material 50 passes into a final vulcanizing section 55 and over a series of rollers 56, 57, 58, 59, 60, 61, 62, 63, and 64, the surface of the rug material 50 being in contact with the rollers 56, 58, 60, 62, and 64, and the surface of the web 12 being in contact with the rollers 57, 59, 61, and 63. The aforementioned rollers are heated by steam or other suitable fluid supplied through conduits 65 and the temperature within these rolls is accurately controlled by means not shown. The alternate engagement of the surface of the rug material 50 and the web 12 results in imparting heat to the foam rubber applied to the web 12 and to the cement applied to the surface of the rug material 50 which causes complete vulcanization of the foam rubber and curing of the cement in order to provide an intimate and inseparable bond between the rug material 50 and the foam rubber.

From the final vulcanizing section 55 the laminated fabric 66 passes into a cooling section 67 in which are disposed rolls 68, 69 and 70 supplied with a cooling fluid through conduits 71 and with cooling air which may escape through a vent 72. Roll 69 may be driven by a motor or other suitable means 73 for pulling the laminated fabric 66 through the final vulcanizing section 55.

The laminated fabric 66 is adequately cooled in the cooling section 67 and from the roll 70 passes between feeding rolls 74 which serve to pull the same through the cooling section 67 after which the laminated fabric 66 may be wound on a roll 75 carried by a support 76.

If desired, trimming means, not shown, may be provided subsequent to the cooling section 67 which would serve to provide a laminated fabric of accurate width and obviously the laminated fabric 66 as it emerges from the cooling section 67 may be cut in order to provide such fabric in any desired length.

It will be seen that by the above described invention there has been provided an apparatus and process for producing a laminated fabric consisting of an open mesh web, a layer of foam rubber and a close mesh fabric such as carpet in which the foam rubber may be visually inspected prior to application to the carpet, in which the foam rubber is adequately washed and dried prior to application to the carpet in order to eliminate objectionable odors therefrom and in which a complete and inseparable bond between the carpet and foam rubber is obtained. It is to be noted that even though the apparatus provides a continuous operation no belt or equivalent conveying means is necessary and that adequate smoothness of the foam rubber is obtained merely by providing a smooth machined surface on the vulcanizing drums or rolls which also eliminates the necessity for providing a doctor blade for gauging thickness control, and the repeated attendance required to remove gelled foam from the blade which causes streaks over the surface when such foam collects thereon. Obviously, any desired heating means may be utilized for providing heat to the vulcanizing rolls and likewise, any desired means may be utilized for controlling such supply of heat and consequently the temperature of such rolls.

It is to be noted that the provision of the inspection station is extremely important since this permits inspection of the foam rubber prior to application of the same to the carpet or other fabric which is relatively expensive and consequently costs of production are maintained at a minimum.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, means to cool a portion of the surface of said gelation roll immediately prior to contact with the foam rubber on an idler roll and feed rolls, said web, said web passing from said gelation roll over said idler roll and between said feed rolls for maintaining a constant tension in said web while passing over said gelation roll, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, said washing section including a bath and a series of sprays and squeezing rolls, a drying section following said washing section and including a heated chamber, a series of rolls arranged in staggered relation whereby said web and foam rubber follows a zig-zag path through said drying section, means for circulating air through said drying section and means for pulling said web and foam rubber through said drying section, an inspection station following said drying section and comprising a series of horizontally disposed rollers over which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

2. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on an idler roll and feed rolls, said web, said web passing from said gelation roll over said idler roll and between said feed rolls for maintaining a constant tension in said web while passing over said gelation roll, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, said washing section including a bath and a series of sprays and squeezing rolls, a drying section following said washing section and including a heated chamber, a series of rolls arranged in staggered relation whereby said web and foam rubber follows a zig-zag path through said drying section, means for circulating air through said drying section and means for pulling said web and foam rubber through said drying section, an inspection station following said drying section and comprising a series of horizontally disposed rollers over which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

3. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, said washing section including a bath and a series of sprays and squeezing rolls, a drying section following said washing section and including a heated chamber, a series of rolls arranged in staggered relation whereby said web and foam rubber follows a zig-zag path through said drying section, means for circulating air through said drying section and means for pulling said web and foam rubber through said drying section, an inspection station following said drying section and comprising a series of horizontally disposed rollers over which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

4. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, a drying section following said washing section and including a heated chamber, a series of rolls arranged in staggered relation whereby said web and foam rubber follows a zig-zag path through said drying section, means for circulating air through said drying section and means for pulling said web and foam rubber through said drying section, an inspection station following said drying section and comprising a series of horizontally disposed rollers over which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

5. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, a drying section following said washing section and including a heated chamber, a series of rolls arranged in staggered relation whereby said web and foam rubber follows a zig-zag path through said drying section, means for pulling said web and foam rubber through said drying section, an inspection station following said drying section and comprising a series of horizontally disposed rollers over which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

6. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, a drying section following said washing section and including a heated chamber, a series of rolls arranged in staggered relation whereby said web and foam rubber follows a zig-zag path through said drying section, an inspection station following said drying section through which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, means for circulating air through said cooling section and means for pulling said laminated fabric through said cooling section and feeding the same to a final winding drum.

7. A continuous laminated fabric making apparatus comprising a spreader roll, means for feeding a continuous web of open mesh fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls disposed in a chamber, said web passing over said vulcanizing rolls with alternate rolls in engagement with said web and with the foam rubber on said web respectively, means for pulling said web and foam rubber through said first vulcanizing section and feeding the same to a washing section, a drying section following said washing section and including a heated chamber, an inspection station following said drying section through which said web and foam rubber passes to facilitate visual inspection of the same, means for supplying a web of relatively close mesh fabric, means for applying cement to one surface of said fabric and feeding said fabric into intimate contact with said foam rubber to unite the same and form a laminated fabric, a second vulcanizing section for completing the curing of said foam rubber and for curing said cement, said second vulcanizing section including a series of heated rolls disposed in a chamber, said laminated fabric passing over said last named rolls with alternate rolls in engagement with said web and with said close mesh fabric respectively, a cooling section following said second vulcanizing section and including a series of rolls disposed for alternate engagement with opposite sides of said laminated fabric, and means for pulling said laminated fabric through said cooling section and feeding the same to a final winding drum.

8. A continuous laminated fabric making apparatus comprising a spreader roll, means for feeding a continuous web of fabric over said spreader roll, means for applying foam rubber to said web in a continuous coating of predetermined thickness, a heated gelation roll rotatably driven in contact with the foam rubber on said web, a first vulcanizing section comprising a series of heated vulcanizing rolls, said web passing over said vulcanizing rolls with alternate rolls in engagement with said web and with the foam rubber on said web respectively, a washing section following said vulcanizing section, a drying section following said washing section, an inspection station following said drying section through which said web and foam rubbber passes to facilitate visual inspection of the same, means for supplying a second web of fabric, means for applying cement to one surface of said last named fabric and feeding said last named fabric into intimate contact with said foam rubber to unite the same and form a laminated fabric, a second vulcanizing section for completing the curing of said foam rubber and for curing said cement, said second vulcanizing section including a series of heated rolls, said laminated fabric passing over said last named rolls with alternate rolls in engagement with said web and with said fabric respectively, a cooling section following said second vulcanizing section and including a series of rolls disposed for alternate engagement with opposite sides of said laminated fabric, and means for pulling said laminated fabric through said cooling section and feeding the same to a final winding drum.

9. A continuous laminated fabric making apparatus comprising a spreader roll, means for feeding a continuous web of fabric over said spreader roll, means for applying foam rubber to said web, a heated gelation roll rotatably driven in contact with the foam rubber on said web, a first vulcanizing section comprising a series of heated vulcanizing rolls, said web passing over said vulcanizing rolls with alternate rolls in engagement with said web and with the foam rubber on said web respectively, a washing section following said vulcanizing section, an inspection station following said washing section through which said web and foam rubber passes, means for supplying a second web of fabric, means for applying cement to one surface of said second fabric and feeding said second fabric into intimate contact with said foam rubber to unite the same and form a laminated fabric, a second vulcanizing section for completing the curing of said foam rubber, said second vulcanizing section including a series of heated rolls, said laminated fabric passing over said last named rolls with alternate rolls in engagement with said web and with said fabric respectively, and a cooling section following said second vulcanizing section.

10. A continuous laminated fabric making apparatus comprising a spreader roll, means for feeding a continuous web of fabric over said spreader roll, means for applying foam rubber to said web, a heated gelation roll rotatably driven in contact with the foam rubber on said web, a first vulcanizing section comprising a series of heated vulcanizing rolls, said web passing over said vulcanizing rolls with alternate rolls in engagement with said web and with the foam rubber on said web respectively, a washing section following said vulcanizing section, an inspection station following said washing section through which said web and foam rubber passes, means for supplying a second web of fabric, means for feeding said second fabric into intimate contact with said foam rubber to unite the same and form a laminated fabric, a second vulcanizing section for completing the curing of said foam rubber, and a cooling section following said second vulcanizing section.

11. A method of making continuous laminated fabric comprising applying foam rubber to one surface of a web of open mesh fabric, gelling said foam rubber by heating, partially vulcanizing said foam rubber by alternately applying heat to said web and to said foam rubber, washing said partially vulcanized foam rubber and web, drying said foam rubber and web, feeding a relatively close mesh fabric and applying cement to one surface thereof, uniting said close mesh fabric and said foam rubber to form a laminated fabric, finally vulcanizing said foam rubber and curing said cement, cooling said laminated fabric and winding the same to form a roll.

12. A method of making continuous laminated fabric comprising applying foam rubber to one surface of a web of open mesh fabric, gelling said foam rubber, partially vulcanizing said foam rubber by alternately applying heat to said web and to said foam rubber, washing said partially vulcanized foam rubber and web, drying said foam rubber and web, feeding a fabric and applying cement to one surface thereof, uniting said last named fabric and said foam rubber to form a laminated fabric, finally vulcanizing said foam rubber and curing said cement, cooling said laminated fabric and winding the same to form a roll.

13. A method of making continuous laminated fabric comprising applying foam rubber to one surface of a web of open mesh fabric, gelling said foam rubber, partially vulcanizing said foam rubber, washing said partially vulcanized foam rubber and web, drying said foam rubber and web, feeding a fabric and applying cement to one surface thereof, uniting said last named fabric and said foam rubber to form a laminated fabric, finally vulcanizing said foam rubber and curing said cement, cooling said laminated fabric and winding the same to form a roll.

14. A method of making continuous laminated fabric comprising applying foam rubber to one surface of a web of open mesh fabric, gelling said foam rubber, partially vulcanizing said foam rubber, washing said partially vulcanized foam rubber and web, drying said foam rubber and web, feeding a fabric and applying cement to one surface thereof, uniting said last named fabric and said foam rubber to form a laminated fabric, finally vulcanizing said foam rubber and curing said cement and winding the same to form a roll.

References Cited in the file of this patent

UNITED STATES PATENTS

| | | |
|---|---|---|
| 2,567,952 | Lewis | Sept. 18, 1951 |
| 2,628,654 | Alderfer | Feb. 17, 1953 |
| 2,641,296 | Marco | June 9, 1953 |